(12) United States Patent
Haan et al.

(10) Patent No.: US 7,021,456 B2
(45) Date of Patent: Apr. 4, 2006

(54) CONVEYOR ROLLER WITH BRAKE

(75) Inventors: Ted W. Haan, Wyoming, MI (US); Kenneth J. Kooistra, Byron Center, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/993,301

(22) Filed: Nov. 19, 2004

(65) Prior Publication Data

US 2005/0121296 A1  Jun. 9, 2005

Related U.S. Application Data

(60) Provisional application No. 60/527,485, filed on Dec. 5, 2003.

(51) Int. Cl.
*B65G 13/06* (2006.01)

(52) U.S. Cl. ............... 198/781.01; 198/788; 193/35 A

(58) Field of Classification Search ............. 193/35 A; 198/835, 780, 788, 790, 781.1, 781.03, 789
See application file for complete search history.

(56) References Cited

U.S. PATENT DOCUMENTS

| | | | |
|---|---|---|---|
| 3,557,925 A | 1/1971 | Zulauf | |
| 3,713,521 A | 1/1973 | Moritake | |
| 3,918,561 A | 11/1975 | Isacsson | |
| 4,082,180 A | 4/1978 | Chung | |
| 5,147,020 A | 9/1992 | Scherman et al. | |
| 5,442,248 A | 8/1995 | Agnoff | |
| 5,582,286 A | 12/1996 | Kalm et al. | |
| 5,642,804 A | 7/1997 | Kellis | |
| 6,131,717 A | 10/2000 | Owen | |
| 6,244,427 B1 | 6/2001 | Syverson | |
| 6,253,909 B1 | 7/2001 | Kalm et al. | |
| 6,467,601 B1 | 10/2002 | Schmale et al. | |
| 6,471,043 B1 | 10/2002 | Schwingshandl et al. | |
| 6,577,092 B1 | 6/2003 | Okai | |
| 6,612,422 B1 | 9/2003 | Roberts et al. | |
| 6,766,900 B1 | 7/2004 | Kanaris | |
| 6,820,736 B1 * | 11/2004 | Itoh et al. ............. | 198/781.01 |
| 6,837,364 B1 | 1/2005 | Kanaris | |

FOREIGN PATENT DOCUMENTS

NL   C 1021991   8/2004

* cited by examiner

*Primary Examiner*—James R. Bidwell
(74) *Attorney, Agent, or Firm*—Van Dyke, Gardner, Linn & Burkhart, LLP

(57) ABSTRACT

A conveyor roller or pulley includes an axle portion mountable to opposite sidewalls of a conveyor and a roller portion rotatable relative to said axle portion. The roller includes a braking device positioned at least partially within said roller portion and selectively operable to restrict rotation of said roller portion relative to said axle portion. The braking device may be biased to restrict rotation, such that the braking device restricts rotation when an actuator of the braking device is deactivated, and allows substantially unrestricted rotation when the actuator is activated. The actuator may be activated when a drive motor of the conveyor is activated to drive one of the rollers of the conveyor, and may be deactivated when the drive motor is deactivated. The conveyor may comprise a roller conveyor or a belted conveyor.

36 Claims, 14 Drawing Sheets

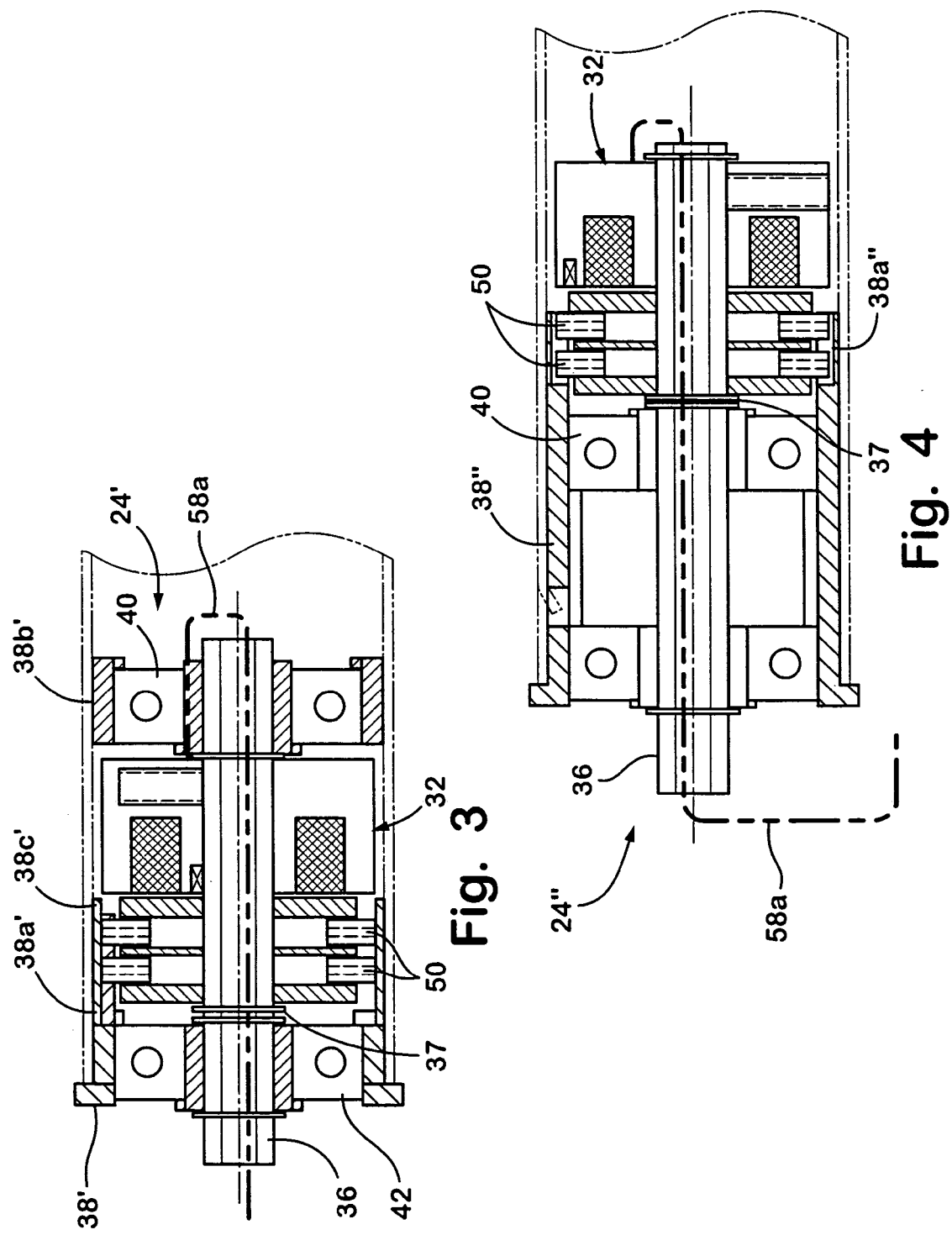

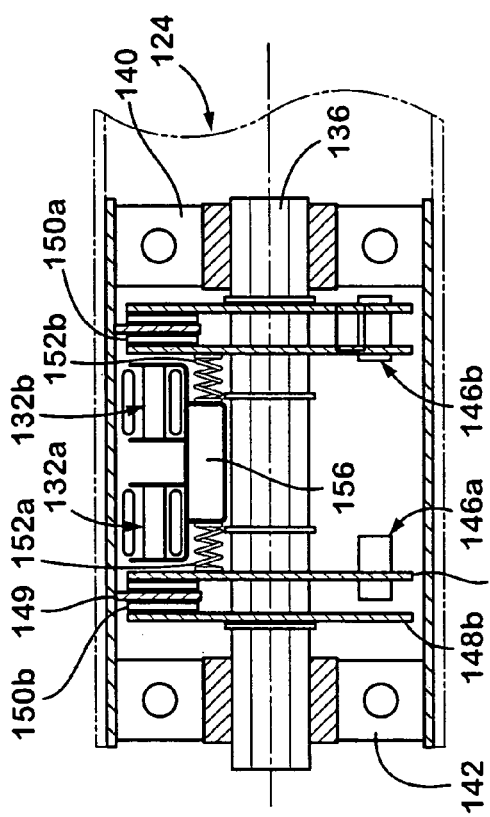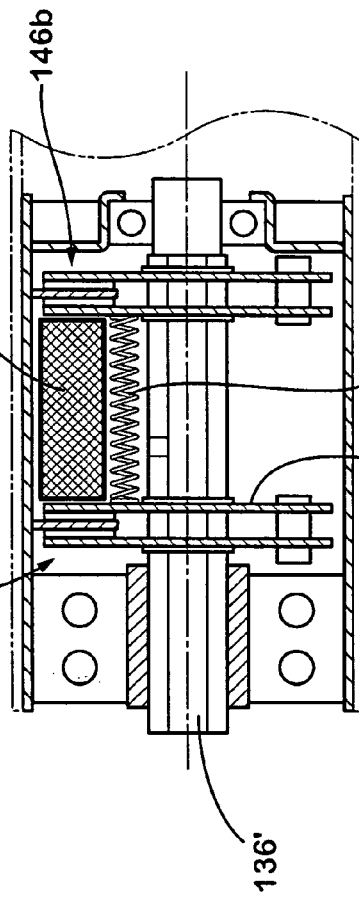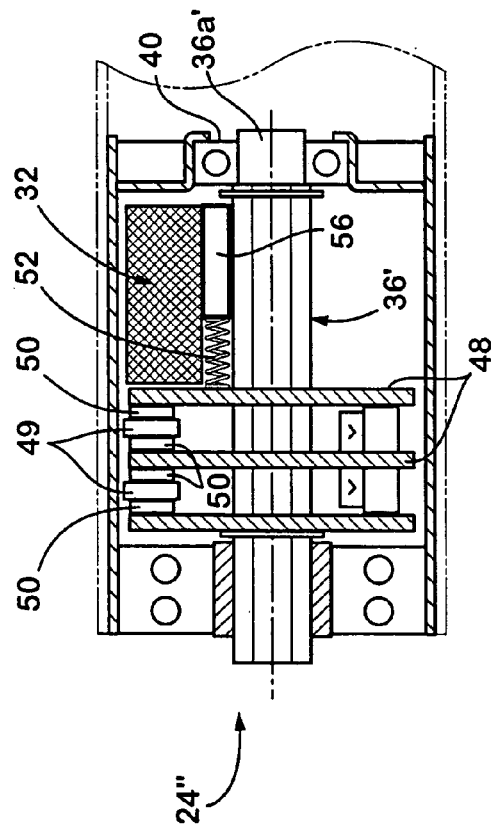

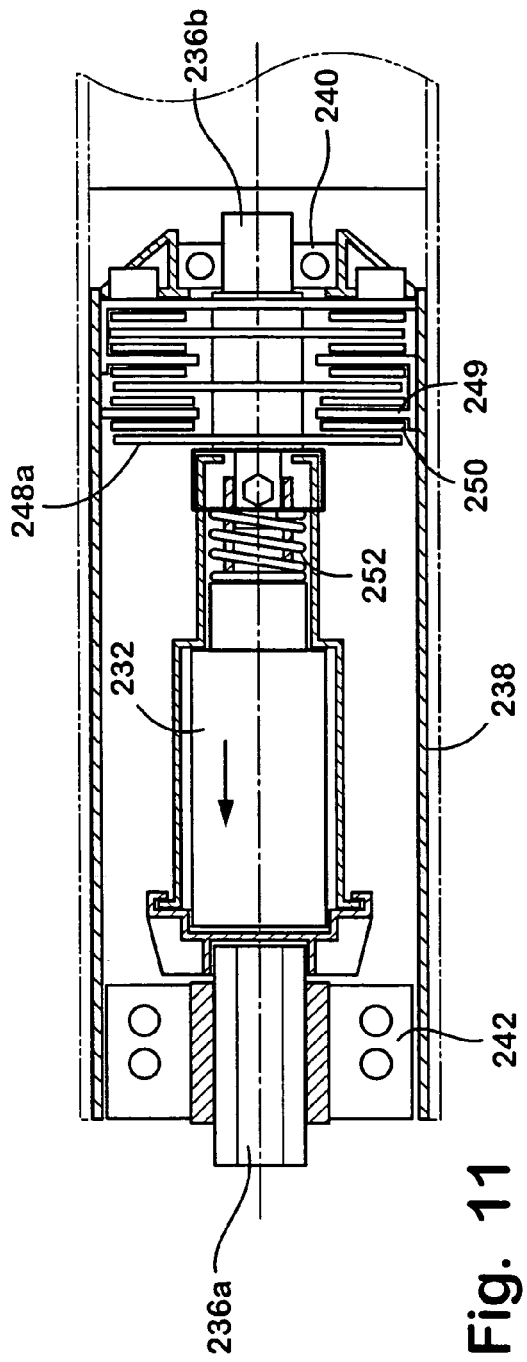
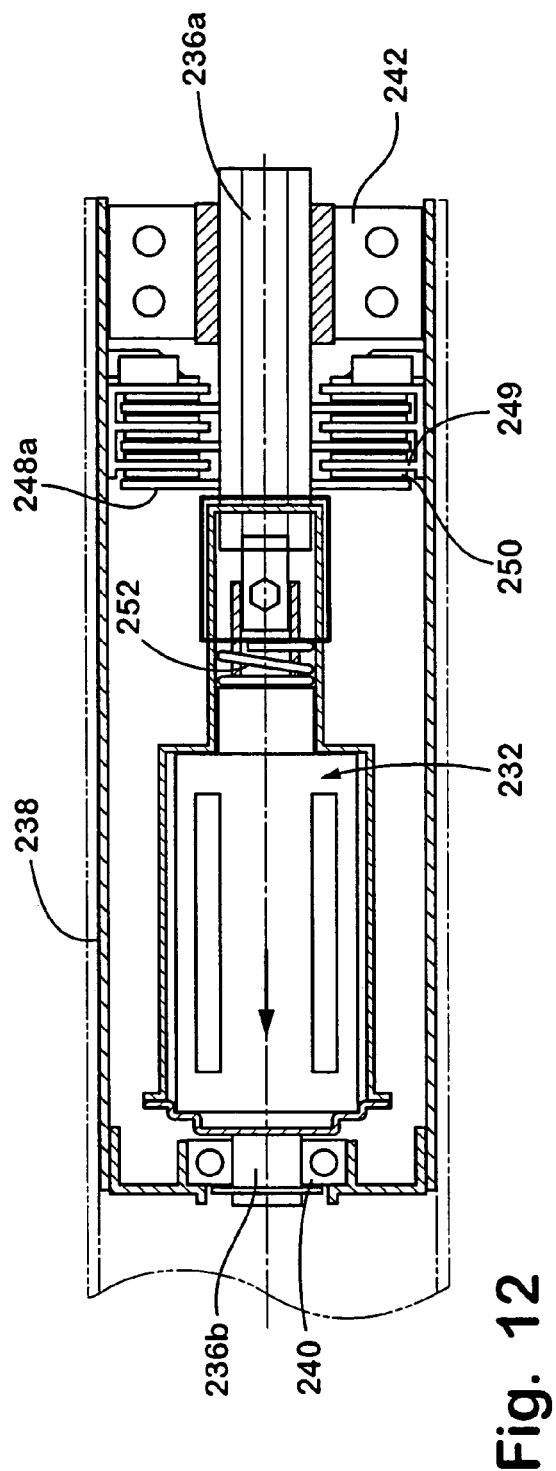
Fig. 11
Fig. 12

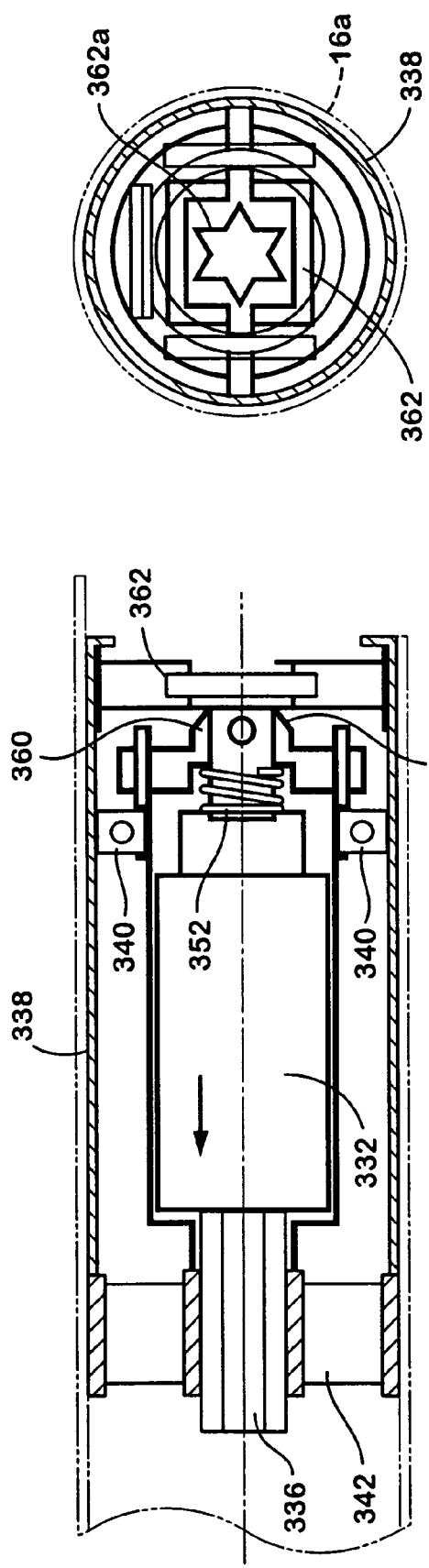

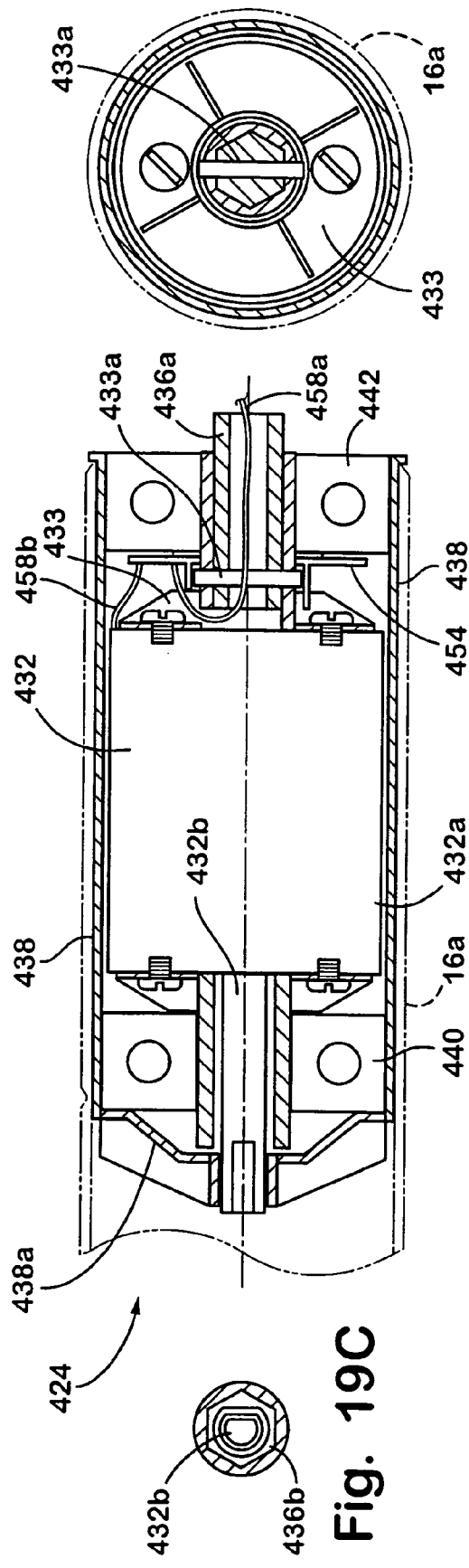

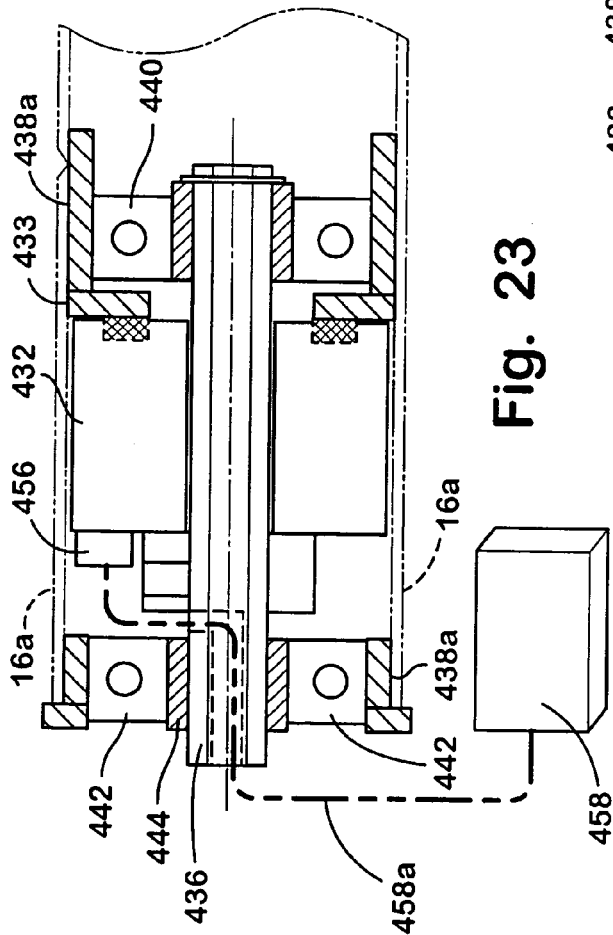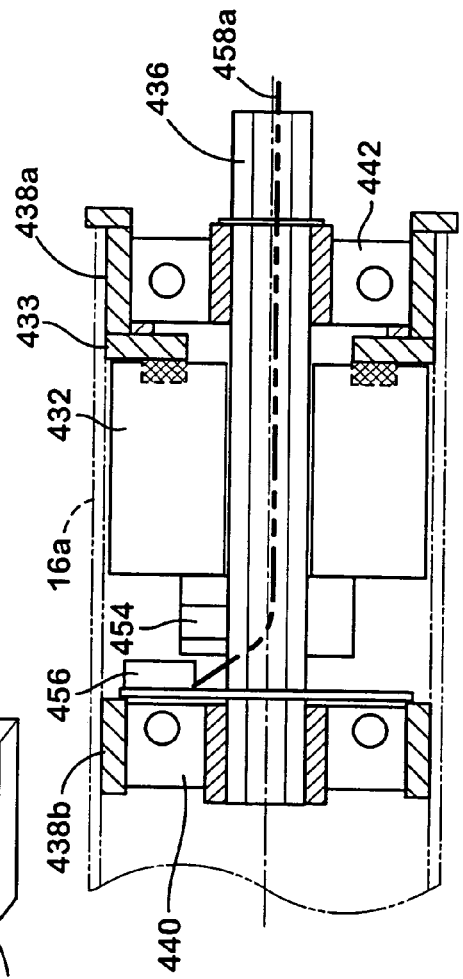
Fig. 23
Fig. 24

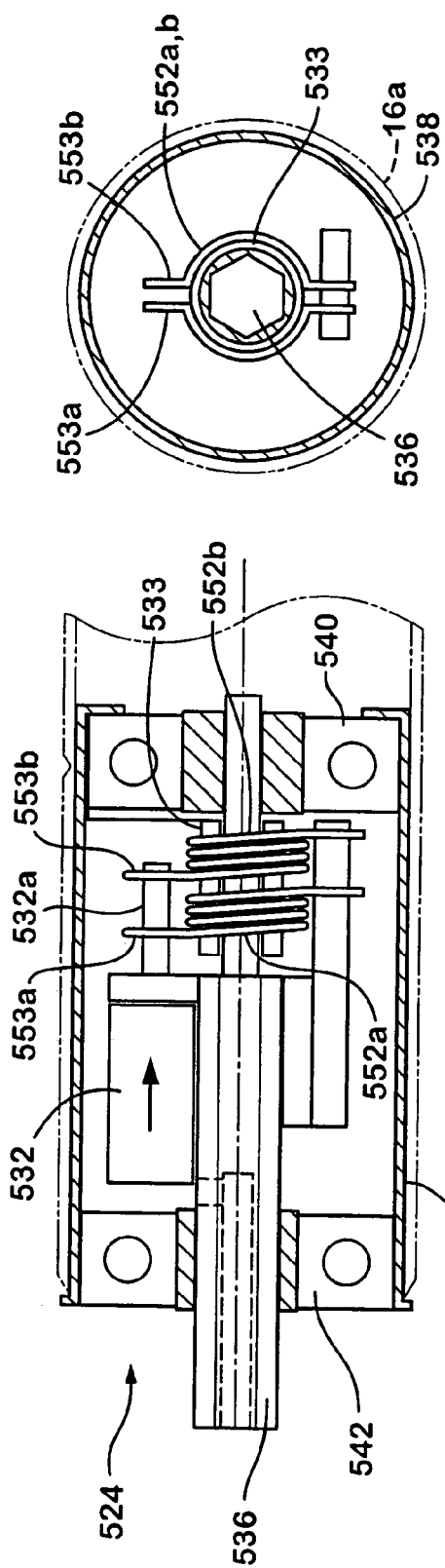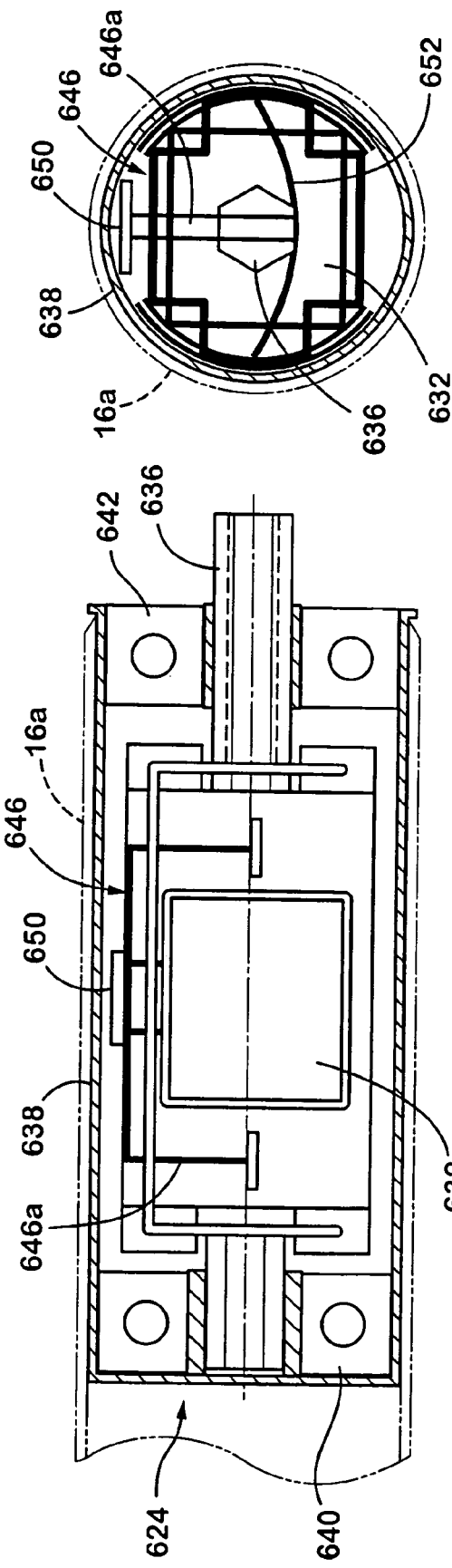

CONVEYOR ROLLER WITH BRAKE

CROSS REFERENCE TO RELATED APPLICATION

The present application claims benefit of U.S. provisional application, Ser. No. 60/527,485, filed Dec. 5, 2003, which is hereby incorporated herein by reference in its entirety.

FIELD OF THE INVENTION

The present invention relates generally to conveyors and, more particularly, to conveyors having driven rollers or pulleys and idler rollers or pulleys, such as belt conveyors or roller conveyors.

BACKGROUND OF THE INVENTION

A belt or roller conveyor typically includes a driving roller or pulley and one or more idler rollers arranged along and between opposite sidewalls. The driving roller or pulley is operable to rotatably drive the other rollers, such as via a continuous conveyor belt reeved around the rollers or pulleys or such as via O-rings or the like around adjacent rollers. When the driving roller is activated, the rollers function to convey articles along the conveyor. When the driving roller is deactivated, the rollers may coast to a stop or may quickly stop as the driving roller stops. Also, when such conveyors are arranged at an incline, the articles on the conveyor may tend to move back down the incline after the driving roller is stopped. The stopping and/or reversing of the rollers of the conveyor may tend to cause excessive strain and wear on the drive gears and/or motor of the driving roller.

SUMMARY OF THE INVENTION

The present invention provides a conveyor that is suitable for continuously conveying articles along the conveyor or along segments or zones of the conveyor, and/or for accumulating articles on the individual segments or zones, and that may provide for accumulation of articles on an incline or a decline. The present invention provides a braking device or brake cartridge for an idler or motorized roller that may function to brake or stop rotation of the roller (and other rollers of the conveyor or zone), such as in response to deactivation of the driving roller of the conveyor or zone.

According to an aspect of the present invention, a brake cartridge for a roller of a conveyor includes an axle portion, a housing and a braking device. The roller is positioned between opposite sidewalls of the conveyor and has a roller portion that is rotatable to convey articles along the conveyor. The axle portion of the brake cartridge is mountable to one of the sidewalls of the conveyor and the housing is rotatably mounted to the axle portion. The housing is insertable into an end of the roller portion of the roller. The braking device is selectively operable to restrict rotation of the housing relative to the axle portion to restrict rotation of the roller portion of the roller when the housing is inserted into the end of the roller portion.

The brake cartridge may include at least one bearing assembly positioned between the housing and the axle portion to rotatably mount the housing to the axle portion. The braking device may include a first plate non-rotatably positioned relative to the housing and a second plate non-rotatably positioned relative to the axle portion. The braking device may be selectively operable to engage the first and second plates to restrict rotation of the housing relative to the axle portion. The braking device may include an actuating device and a biasing member. The actuating device may be selectively activatable to disengage the first and second plates. The biasing member may be configured to engage the first and second plates when the actuating device is deactivated. The actuating device may comprise an electromagnet and/or a solenoid. The actuating device may be deactivated when a driven roller of the conveyor is deactivated.

According to another aspect of the present invention, a conveyor for conveying articles along a conveying surface includes a plurality of rollers mounted between opposite sidewalls of the conveyor. One of the rollers is a braking roller, which comprises a roller portion, a brake cartridge inserted at least partially within one end of the roller portion, and a second cartridge inserted at least partially within the other end of the roller portion. The brake cartridge comprises a housing, an axle portion and a braking device. The braking device is selectively operable to restrict rotation of the housing relative to the axle portion. The housing engages an inner surface of the roller portion. The axle portion is mounted to one of the sidewalls. The second cartridge comprises a second axle portion and a second housing rotatable about the second axle portion and engaging the inner surface of the roller portion. The second axle portion is mounted to the other of the sidewalls. The second cartridge comprises a motor cartridge, an idler cartridge or a second brake cartridge. The conveyor includes at least one drive member reeved around at least some of the rollers.

One of the rollers may include a motor cartridge inserted at least partially within a roller portion. The motor cartridge has an internal motor that is activatable to rotatably drive the roller portion relative to an axle portion of the motor cartridge and deactivatable to stop the driving. The braking device may be operable to restrict rotation of the housing and the roller portion relative to the axle portion when the internal motor of the motor cartridge is deactivated. The conveyor may include a control that is operable to activate and deactivate the internal motor and the actuating device together.

According to another aspect of the present invention, a conveyor for conveying articles along a conveying surface includes at least one idler roller mounted between opposite sidewalls, a driven roller mounted between the opposite sidewalls of the conveyor, at least one drive member reeved around the driven roller and the at least one idler roller, and a braking device. Each of the driven roller and the at least one idler roller has a roller portion that is rotatable relative to an axle portion. The axle portions are mounted to the opposite sidewalls. The driven roller is actuatable to rotatably drive the roller portion relative to the axle portion of the driven roller. The driven roller is operable to drive the at least one drive member to rotatably drive the roller portion of the at least one idler roller to move articles along the conveyor. The driven roller is deactivatable to stop conveying the articles along the conveyor. At least one of the rollers comprises a braking roller and has the braking device positioned at least partially within the roller portion of the braking roller. The braking device is selectively operable to restrict rotation of the roller portion of the braking roller relative to the axle portion of the braking roller. The braking device is operable to restrict rotation of the roller portion when the driven roller is deactivated.

The conveyor may comprise a belt conveyor, where the drive member comprises a continuous conveyor belt reeved around the driving roller and at least one idler roller. Alternately, the conveyor may comprise a roller conveyor, where the drive member may comprise a plurality of bands or O-rings connected between adjacent pairs of rollers along the roller conveyor. The conveyor may comprise two or more zones, which may be independently operable to allow for accumulation of articles at one or more zones along the conveyor. Optionally, the conveyor may be implemented at an incline or a decline, and may be operable to accumulate articles on the incline or decline.

Therefore, the present invention provides a brake or braking device or brake cartridge for a roller of a conveyor. The braking device may be positioned at least partially within a roller portion of a roller and is selectively operable to stop or limit or restrict rotation of the roller portion of the roller relative to the axle portion of the roller. The braking device may be operable to allow substantially unrestricted rotation when a motorized roller is activated and to substantially restrict rotation when the motorized roller is deactivated. The braking device thus may stop rotation of the roller portion when the conveyor or zone or section is not conveying articles therealong. The braking device of the present invention may be implemented at an inclined conveyor section and may limit or substantially preclude the articles from moving down the inclined conveyor section when the motorized or driven roller is deactivated or stopped. The braking device functions to stop and hold the articles on the conveying surface, such that the motor and gears of the motorized roller do not have to perform such functions.

These and other objects, advantages, purposes and features of the present invention will become apparent upon review of the following specification in conjunction with the drawings.

BRIEF DESCRIPTION OF THE DRAWINGS

FIG. 3 is a sectional view of another roller and brake cartridge in accordance with the present invention;

FIG. 4 is a sectional view of another roller and brake cartridge in accordance with the present invention;

FIG. 5 is a sectional view of another roller and brake cartridge in accordance with the present invention;

FIG. 6 is a sectional view of another roller and brake cartridge in accordance with the present invention;

FIG. 7 is a sectional view of another roller and brake cartridge in accordance with the present invention;

FIG. 11 is a sectional view of another roller and brake cartridge in accordance with the present invention;

FIG. 12 is a sectional view of another roller and brake cartridge in accordance with the present invention;

FIG. 17A is an end elevation of a roller and a brake cartridge in accordance with the present invention;

FIG. 17B is a sectional view of the roller and brake cartridge of FIG. 17A;

FIG. 18 is a sectional view of another roller and brake cartridge in accordance with the present invention;

FIG. 19A is an end elevation of another roller and brake cartridge in accordance with the present invention;

FIG. 19B is a sectional view of the roller and brake cartridge of FIG. 19A;

FIG. 19C is an opposite end elevation of the brake cartridge of FIG. 19A;

FIG. 20 is a sectional view of another roller and brake cartridge in accordance with the present invention;

FIG. 23 is a sectional view of another roller and brake cartridge in accordance with the present invention;

FIG. 24 is a sectional view of another roller and brake cartridge in accordance with the present invention;

FIG. 25A is an end elevation of another roller and brake cartridge in accordance with the present invention;

FIG. 25B is a sectional view of the roller and brake cartridge of FIG. 25A;

FIG. 26A is an end elevation of another roller and brake cartridge in accordance with the present invention;

FIG. 26B is a sectional view of the roller and brake cartridge of FIG. 26A; and

DESCRIPTION OF THE PREFERRED EMBODIMENTS

Figure 1:
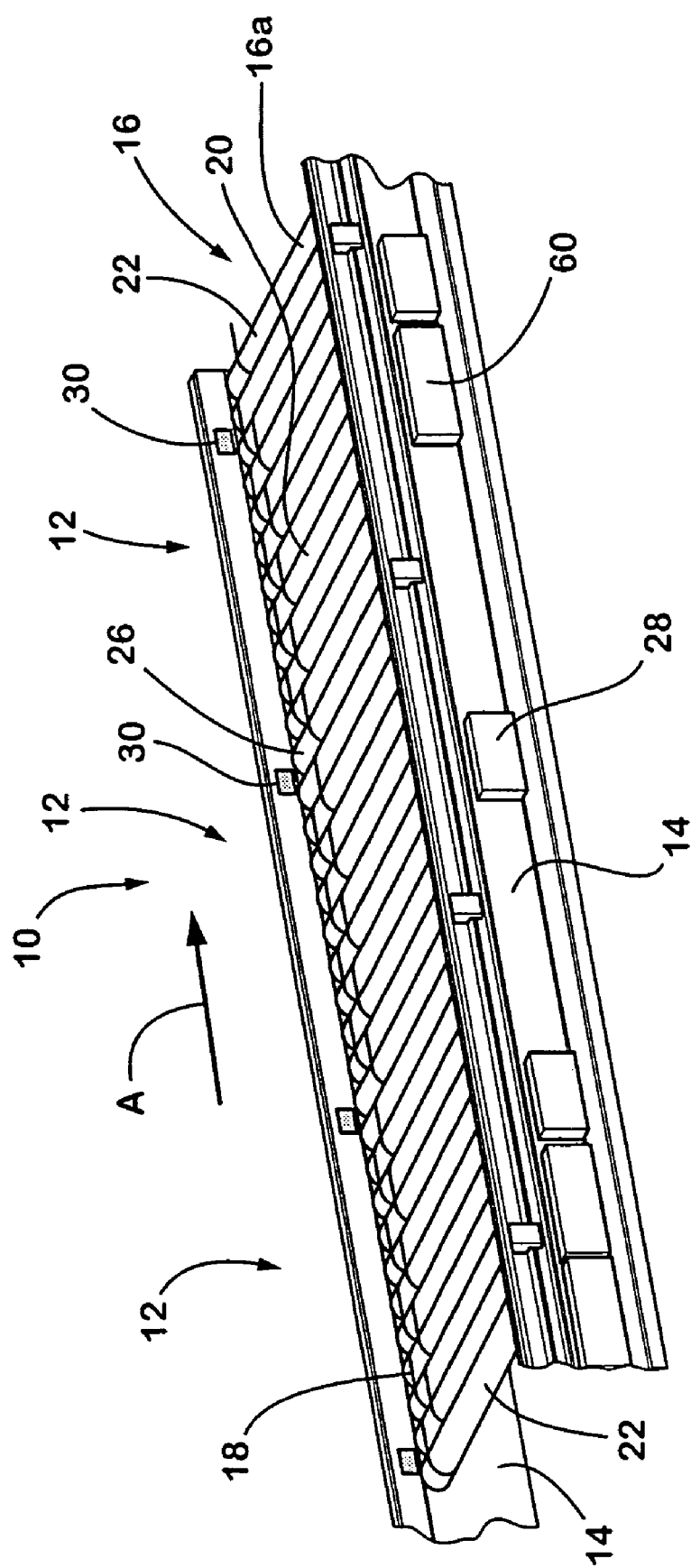
FIG. 1 is a perspective view of a roller conveyor including at least one roller and brake cartridge in accordance with the present invention.

Referring now specifically to the drawings and the illustrative embodiments depicted therein, a roller conveyor 10 includes one or more zones or segments 12 positioned along and between opposite sidewalls or side frames 14, and is operable to convey articles in a direction of conveyance A (FIG. 1). Each segment or zone 12 includes a plurality of rollers 16 and a plurality of drive members 18 (such as O-rings or the like) around adjacent pairs of rollers 16. Each zone 12 may be independently operable to accumulate articles on the segment or zone or to move articles in the direction A onto a next, adjacent segment or zone or onto another conveyor, such as another roller conveyor, a belt conveyor, a slider bed, or the like, or any other means for receiving articles from a discharge end of the last zone or segment of roller conveyor 10.

Rollers 16 of each zone 12 include a motorized roller 20 and one or more non-motorized or idler rollers 22. Motorized roller 20 may rotatably drive the idler rollers 22 of the respective zone via the drive members or O-rings 18. At least one of the motorized roller 20 and idler rollers 22 includes a brake cartridge 24 (FIGS. 2A and 2B) that is operable to brake or stop or limit or restrict rotation of the roller portion of the roller relative to the shaft or axle portion of the roller (thereby defining a braking roller, such as generally indicated at 26 in FIG. 1). The braking roller 26 may be positioned anywhere along the zone 12 and may be the motorized roller or any of the idler rollers of the zone.

The motorized roller 20 and brake cartridge 24 may be controlled by a control unit 28 or the like, such as in response to one or more article sensors 30 positioned along the conveyor, as discussed below. Motorized roller 20 may be actuated to rotate and drive the other rollers of the respective zone, while brake cartridge 24 may be simultaneously or correspondingly released to allow rotation of the brake cartridge 24 and rollers 16 of the zone 12. For example, the motor of motorized roller 20 may be actuated while an actuator or actuating device 32 (FIG. 2B), such as an electromagnetic solenoid or electromagnet or the like, of brake cartridge 24 may be correspondingly actuated to release the brake. Upon deactivation of the motor of motorized roller 20, the actuating device or solenoid 32 may be deactivated, whereby the brake is applied to stop rotation of the rollers, as discussed below. The conveyor 10 thus may convey articles along the zones and may accumulate articles on the zones, and may limit coasting of the articles after the motorized roller is stopped and may limit reversing of the articles on the zone after the motorized roller is stopped, such as may occur when the articles are being conveyed and accumulated on an inclined conveyor section.

Figure 2A:
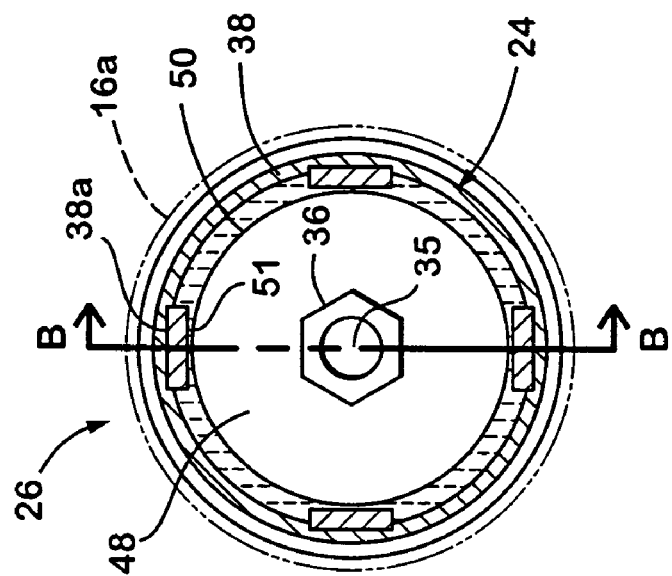
FIG. 2A is an end elevation of a roller and a brake cartridge in accordance with the present invention.
Figure 2B:
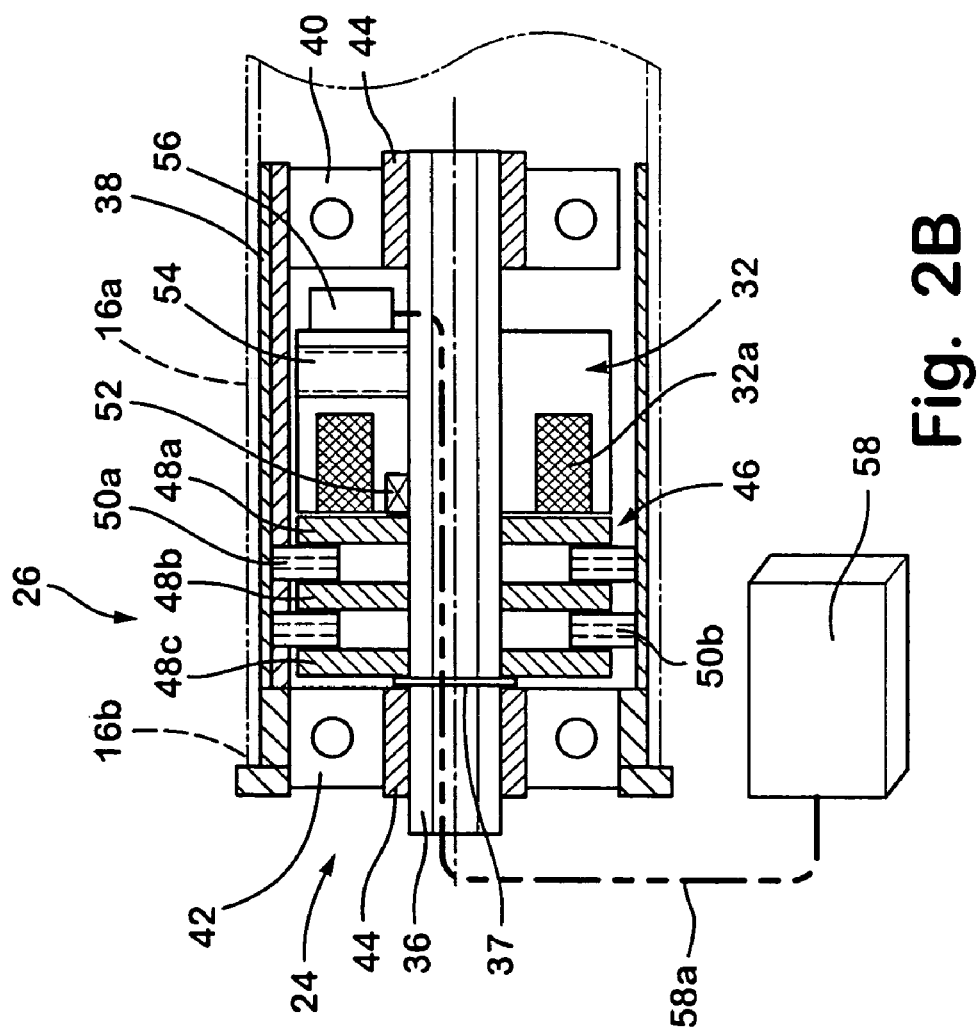
FIG. 2B is a sectional view of the roller and brake cartridge of FIG. 2A.
Figure 9:
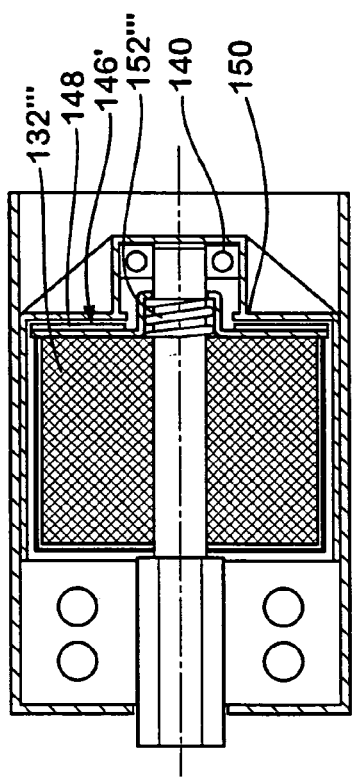
FIG. 9 is a sectional view of another roller and brake cartridge in accordance with the present invention.

The roller portion 16a may comprise a generally cylindrical sleeve or tube or may comprise a sleeve or tube having varying diameters therealong, such as a tapered tube or a crowned tube or the like, without affecting the scope of the present invention. As shown in FIG. 2B, at least one end of the roller portion 16a receives the brake cartridge 24 therein, whereby a stub axle or axle portion 36 may extend longitudinally outwardly from the end of the roller portion for mounting the roller to the conveyor sidewall. In the illustrated embodiments, the axle portion 36 comprises a hexagonal-shaped portion to insert at least partially into and fit snugly within one of the correspondingly formed openings (not shown) in the conveyor sidewalls 14 or within a mounting member or block or device (also not shown) positioned at the conveyor sidewall. However, the axle portions may comprise other shapes, depending on the particular application of the cartridges and rollers, and depending on the shape of the openings in the conveyor sidewalls or mounting member or device, without affecting the scope of the present invention.

Motorized roller 20 may comprise a self driven roller with an internal motor which is operable to rotate a roller portion relative to a shaft portion of the roller, such as a motorized roller of the types commercially available from various sources. For example, the roller may comprise a DC motorized roller, such as a 12 volt DC motorized roller or the like, such as a roller of the type disclosed in U.S. Pat. No. 6,244,427, the disclosure of which is hereby incorporated herein by reference. Optionally, the roller may comprise a 24 volt DC motorized roller or a 42 volt DC motorized roller or a 48 volt DC motorized roller or the like. For example, the motorized roller may comprise a 48 volt DC motorized roller (or a 24 volt DC motorized roller) having a diameter of approximately 50 mm and an overall width of between 500 mm and 900 mm. The 48 volt DC motorized roller may comprise a DC brushless motor and may be operable at speeds between approximately 130 rpm and 1150 rpm and may provide an output of approximately 3 Nm of torque at approximately 400 rpm and approximately 1.5 Nm of torque at approximately 1150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller directly, such as disclosed in U.S. Pat. No. 6,244,427, or may drive the roller via a gear train or the like, such as disclosed in U.S. Pat. No. 5,442,248, the disclosures of which are hereby incorporated herein by reference.

The motorized roller 20 thus drives the O-rings 18 which drive the adjacent idler rollers 22, which freely rotate about their shaft portions and drive the next adjacent idler rollers via respective O-rings. The idler rollers 22 may be any type of rollers, such as conventional, freely rotating rollers, such as the types also commercially available from various sources.

The internal motor and axle shaft or non-rotating portion of the motorized roller may be incorporated into a motorized cartridge that may be inserted into one end of a roller portion, while a stub axle cartridge is inserted into the other end to form the motorized roller. Likewise, the idler rollers 22 may have stub axle cartridges inserted into both ends of a roller portion. One of the stub axle cartridges of one of the rollers 20, 22 may be replaced by a brake cartridge 24 to define the braking roller 26 of the conveyor or zone.

Brake cartridge 24 includes a sleeve or housing 38, an inner bearing assembly 40, an outer bearing assembly 42, and axle portion 36. As shown in FIGS. 2A and 2B, housing 38 of brake cartridge 24 is received within an end portion 16b of the outer roller portion or tube 16a of braking roller 26, and may be press fit and frictionally retained within roller portion 16a or otherwise generally secured within the roller portion 16a. Housing 38 may comprise a generally cylindrical and hollow housing and may receive bearing assemblies 40, 42 therein. The inner races of bearing assemblies 40, 42 may receive respective inner adapters 44 that may receive axle portion 36. Inner adapters 44 define a generally hexagonal-shaped passageway for slidably receiving axle portion 36 therethrough, such that axle portion 36 is non-rotatable and axially or longitudinally slidable relative to inner adapters 44. Bearing assemblies 40, 42 may comprise ball bearing assemblies or any other form of bearings or bearing assemblies, without affecting the scope of the present invention. Housing 38 (and roller portion 16a of braking roller 26) thus may rotate around and be supported at axle portion 36 via bearing assemblies 40, 42.

Brake cartridge 24 also includes actuating device 32 and a braking device 46 that are selectively operable to brake or limit or stop rotation of housing 38 around axle portion 36. Actuating device 32 may be fixedly mounted to axle portion 36. For example, actuating device 32 may include a hexagonal passageway therethrough for receiving the axle portion and may be securable at a particular location along the axle portion via a set screw 54 or other fastener or locking means or the like.

In the illustrated embodiment of FIGS. 2A and 2B, braking device or mechanism 46 includes three metallic discs 48a, 48b, 48c that are spaced apart and adjacent to braking pads 50a, 50b. Metallic discs 48 may be attached to or keyed to or non-rotatably positioned on axle portion 36, while braking pads 50 may likewise be attached to or keyed to or non-rotatably positioned on an inner surface of housing 38. For example, the braking pads 50 may include notches or the like 51 (FIG. 2A) along their outer circumference that receive protrusions 38a of housing 38 to substantially non-rotationally position the pads 50 within housing 38, while allowing longitudinal or sliding movement of pads 50 along housing 38. The protrusions 38a extend radially inward from an inner surface of housing 38 and may be integrally molded with the plastic housing or may be secured thereto. Other means for non-rotatably securing the pads relative to the housing may be implemented, without affecting the scope of the present invention.

The metallic discs 48 may likewise be non-rotatably secured to the axle portion 36 and may be slidable along the axle portion 36. In the illustrated embodiment, metallic discs 48 include a hexagonal-shaped opening (or other non-circular shape) through their center regions for receiving the hexagonal-shaped axle portion 36 (or other non-circular shape), such that the metallic discs 48 may slide longitudinally along axle portion 36, but will not rotate relative to axle portion 36. A stop ring 37 is positioned around axle portion 36 to limit longitudinal movements of discs 48 and pads 50 along axle portion 36 and housing 38. Although shown and described as having the pads slidably and non-rotatably positioned at the housing and the discs slidably and non-rotatably positioned at the axle portion, the pads and discs may be reversed or may be non-rotatably secured via other means, without affecting the scope of the present invention. Both the discs 48 and pads 50 thus may be axially movable along the axle portion 36 and housing 38, such that the discs may be moved and pressed into engagement with the pads 50 to brake or stop the roller, and moved away from such engagement to release the brake, as discussed below.

Actuating device or electro-magnet or solenoid 32 is operable to energize an electro-magnet 32a to magnetically pull metallic disc 48a away from braking pad 50a when actuating device 32 is actuated, whereby disc 48a is moved toward actuating device 32 and away from pad 50a, which also releases or separates or frees up the other discs and pads, as discussed below. Therefore, when actuating device 32 is actuated, braking device 46 is disengaged, such that housing 38 (and roller portion 16a) is free to rotate about the axle portion 36 of braking cartridge 24 and braking roller 26. When actuating device 32 is deactuated, disc 48a is released, whereby a biasing member or spring 52 functions to push or move or urge disc 48a toward and into engagement with the pad 50a. As disc 48a is pressed against pad 50a, the pad 50a may move along and engage the next disc 48b, which in turn may move and engage the next pad 50b, which then may engage the third disc 48c, such that the discs 48 and pads 50 are pressed or sandwiched together between biasing member 52 and stop ring 37. Further movement of the discs 48 and pads 50 along axle portion 36 is limited or substantially precluded by stop ring 37 that is fixedly positioned at axle portion 36.

The pressing together of the discs 48 and pads 50 functions to limit or restrict or substantially preclude relative movement or rotation of the pads 50 relative to the discs 48 and, thus, relative movement of housing 38 and roller portion 16a relative to axle portion 36. When actuating device 32 is activated, a magnet 32a of solenoid functions to pull the nearest metallic disc 48a toward actuating device 32 and away from pad 50a, such that the disc 48a is retracted from the pads 50 and the biasing member or spring 52 is compressed. With disc 48a retracted, the other discs 48b, 48c and pads 50 may separate enough to allow for substantially unrestricted rotation of housing 38 and roller portion 16a about the axle portion 36. The separation of the discs and pads does not have to be a substantial distance to allow for such substantially unrestricted rotation.

Actuating device 32 may be connected to an internal control 56 that is operable to selectively activate and deactivate actuating device 32. Control 56 may be connected to or in electrical communication with a power source 58 of conveyor 10. For example, control 56 may connect to power source 58 via an electrical wire or link 58a that travels along a passageway 35 in axle portion 36 and out to the power source 58, which may be positioned at or mounted to one of the sidewalls of the conveyor. Control 56 may also be in communication with the control 28 (FIG. 1) of the internal motor of motorized roller 20 which may be operable to selectively activate and deactivate the internal motor to convey and accumulate articles on the conveyor, or may be in communication with a central or main control unit 60 (FIG. 1) that is operable to control both actuating device 32 or brake cartridge control 56 and the motor or motorized roller control 28. Control 56 thus may activate and deactivate the actuating device 32 generally synchronously with control 28 activating and deactivating the internal motor of motorized roller 20.

Optionally, it is envisioned that the brake cartridge of the present invention may not include a separate control, and may be connected to or in communication with control 28 of motorized roller 20 or with the central or main control unit 60 of the conveyor. The control 28, 60 may be operable to activate the internal motor of motorized roller 20 and substantially simultaneously activate actuating device 32 to drive the conveyor, and likewise to deactivate the internal motor of motorized roller 20 and substantially simultaneously deactivate actuating device 32 to stop the conveyor. The control thus may control both the actuating device or solenoid and the internal motor together, such that the roller motor may activate only when the actuating device is activated to limit or substantially preclude situations where the motor may be activated while the brake cartridge is braking or restricting rotation. It is further envisioned that the brake cartridge may be in electrical connection or communication with the motor of the motorized roller and thus may be activated and deactivated directly with the internal roller motor.

Optionally, the actuating device or solenoid may be activated to pull back or retract the discs to release the brake via a first voltage signal, and then may be maintained in its activated state via a second voltage signal. Because a higher voltage may be required to activate the solenoid to move the metallic disc 48a against spring 52 than the voltage required to maintain activation of the solenoid to hold the disc 48a away from the pads 50, the first voltage signal may be higher or greater than the second. The lower second voltage signal then maintains activation of the solenoid or electromagnet during driving of the conveyor and, thus, may conserve energy during operation of the conveyor, because the higher energy signal is only implemented at the onset of the motorized roller.

As shown in FIG. 1, each zone or segment 12 of roller conveyor 10 may also include a photo eye or sensor 30 for detecting articles or packages or the like at or on the conveying surface of the respective zone. Control 28 may independently operate the motorized rollers 20 of the respective zones to move the articles along segment 12 and/or to temporarily stop the movement of the article or articles to accumulate articles on segment 12 in response to the sensor or sensors 30 and depending on the particular application of roller conveyor 10, as discussed in detail below. Roller conveyor 10 thus may be operable to accumulate articles on one or more of the segments or zones of the conveyor. Optionally, roller conveyor 10 may be operable on an incline or decline and may accumulate articles on the incline or decline. It is further envisioned that roller conveyor 10 may be operable to move articles, such as upward along an incline, as the articles are required by a downstream device or system. For example, the conveyor of the present invention may convey and feed stacks of trays to a tray destacking apparatus, such as a tray destacking apparatus of one of the types disclosed in commonly assigned U.S. patent application Ser. No. 10/095,829, filed Mar. 12, 2002 by Schiesser et al. for TRAY DESTACKER, now U.S. Pat. No. 6,846,153, which is hereby incorporated herein by reference. It is further envisioned that the conveyor and brake cartridge of the present invention may be used in trailer loader or unloader applications, such as an extendable loader or unloader for extending the conveying surface from a support base outward and into a truck trailer or the like for loading or unloading articles into or out from the trailer, without affecting the scope of the present invention. The brake cartridge and/or brake roller may function to limit movement or the articles back down the inclined conveyor section when the motorized roller is deactivated.

The control 28 and photo-eyes or article sensors 30 may be operable to accumulate articles on the zones of the belt conveyor, and may be operable to individually control operation of at least some of the zones, such as by utilizing accumulating logic and/or circuitry and the like, such as by utilizing the accumulating logic and/or principles disclosed in U.S. patent application Ser. No. 10/605,277, filed Sep. 19, 2003 by Haan et al., for ACCUMULATING CONVEYOR SYSTEM, which is hereby incorporated herein by reference. Article sensors 30 may be of the type disclosed in U.S. Pat. Nos. 5,582,286 and 6,253,909, and/or U.S. patent application Ser. No. 10/605,277, filed Sep. 19, 2003 by Haan et al., for ACCUMULATING CONVEYOR SYSTEM, which are hereby incorporated herein by reference.

In the illustrated embodiment, each article sensor 30 comprises a photosensor positioned at a downstream end of a respective zone 12 and operable to detect products or articles as they move from the downstream end of one zone to the upstream end of the adjacent zone. The motorized or driven roller 20 of a particular zone may be selectively activated or deactivated by control 28 in response to a corresponding article sensor 30, or in response to more than one of the article sensors positioned along the conveyor, to move or stop an article or articles that is/are present on the respective zone, as discussed below. Motorized rollers 20 thus may be directly driven and operable to selectively and independently convey or accumulate one or more articles on the associated conveyor zones in response to one or more of the article sensors 30.

For example, it is envisioned that the motorized rollers may be operable in a "sleep mode", such as described in U.S. Pat. Nos. 5,582,286 and 6,253,909, the disclosures of which are hereby incorporated herein by reference. In such a mode of operation, control 28 may activate the motorized roller of a particular zone in response to an article being detected at the beginning of the zone (or at the end of the immediate upstream zone) and may deactivate the motorized roller after the article is moved to the next or downstream zone, such that the motorized roller of a particular zone is only activated when an article is present at the zone and when the article is to be conveyed along the zones of the conveyor. If the downstream zones are not activated, then the motorized roller of the particular zone may be deactivated to accumulate the detected article or articles on that particular zone of the conveyor. Such a sleep mode operation thus only activates the motorized roller of a zone when an article to be conveyed is present at the particular zone, and thus reduces operation of the motorized rollers to increase the life cycle of the rollers.

The roller conveyor of the present invention thus may be operable to accumulate articles on one or more of the segments or zones of the conveyor. Optionally, the roller conveyor may be operable on an incline or decline and may accumulate articles on the incline or decline. It is further envisioned that the roller conveyor of the present invention may be operable to move articles, such as upward along an incline, as the articles are required by a downstream device or system, and may stop the articles on the incline and limit downward movement or backing up of the articles down the inclined conveying surface when the motorized roller is deactivated. Because the motor of the motorized roller and the actuating device and braking device of the brake cartridge may be operable together, the brake may be activated (i.e. the solenoid may be deactivated) substantially simultaneously with the deactivation of the motor of the motorized roller to limit or substantially preclude reversing of the articles on the inclined conveyor.

With reference to FIGS. 3–26, other embodiments are shown of brake cartridges in accordance with the present invention. The similar components of each cartridge are shown with the same reference numbers as in FIGS. 2A and 2B, except that some of the embodiments are shown with multiples of 100 added to the reference numbers for brake cartridge 24, discussed above.

As shown in FIG. 3, the housing 38' of a brake cartridge 24' may include separate portions 38a', 38b', where the pads 50 are slidably and non-rotatably positioned at and along an end portion 38c' of portion 38a' and the inner bearing assembly 40 is positioned at inner housing portion 38b'. The actuating device or electro-magnet or solenoid 32 may be positioned generally between the portions 38a', 38b', such that the outer periphery of the actuating device may not interfere with the cartridge housing while the housing is rotating about the axle portion 36. Similarly, and as shown in FIG. 4, the actuating device or electro-magnet or solenoid 32 of a brake cartridge 24" may be positioned on axle portion 36 and longitudinally inwardly of housing 38". The actuating device 32 may be positioned inward of inner bearing assembly 40, while pads 50 are slidably and non-rotatably positioned at an inward end 38a" of housing 38". Both of these cartridges 24', 24" may provide enhanced assembly of the cartridges because the pads may be positioned generally at an end of the housing or housing portions and do not have to be slid substantially into the housing or have the housing assembled or molded around the pads.

The brake cartridge 24''' of FIG. 5 may be substantially similar to brake cartridge 24 of FIGS. 2A and 2B, except that the inner bearings 40' may be smaller bearings that are positioned around a narrowed portion 36a' of axle portion 36'. Also, optionally, the brake pads 50' may be positioned between adjacent pairs of metallic discs 48' and outer metallic discs 49. For example, the metallic discs 48' may be slidably and non-rotatably positioned along axle portion 36', while outer metallic discs 49 may be slidably and non-rotatably positioned along housing 38. The discs 48' or discs 49 may have respective brake pads 50' secured thereto, such that the brake pads 50' are positioned between the metallic discs 48', 49. When the discs 48' are released by actuating device 32, the discs 48', 49 and pads 50 may compress together in response to the spring force exerted at the discs 48' by biasing member or spring 52. Although only one half of actuating device 32 is shown in FIG. 5, the actuating device may be positioned substantially around the axle portion, as discussed above.

The axle cartridge 124 of FIG. 6 includes a pair of actuating devices or electro-magnets or solenoids 132a, 132b adjacent to respective braking devices 146a, 146b. Braking devices 146a, 146b are positioned at opposite ends of actuating devices 132a, 132b and at biasing members 152a, 152b positioned along axle portion 136. Each braking device 146a, 146b includes metallic discs 148a, 148b and outer metallic discs 149 and brake pads 150a, 150b. The actuating device 132a, 132b and spring 152a, 152b may be adjacent to metallic disc 148a, which may have a brake pad 150a positioned at an outer circumferential portion of disc 148a and generally adjacent to outer metallic disc 149. The second metallic disc 148b may also have a brake pad 150b positioned thereon and may be at the opposite side of outer metallic disc 149. Actuation of each actuating device 132a, 132b causes retraction of metallic disc 148a of each braking device 146a, 146b to disengage the braking device and free up or release outer metallic disc 149 to allow rotation of housing 138 about axle portion 136 in a similar manner as described above. The two actuating devices 132a, 132b may be operable via a single control 156 or may be operable independently or via another control of the conveyor or motorized roller, without affecting the scope of the present invention. As shown in FIG. 7, a single actuating device or electro-magnet or solenoid 132' may function to retract metallic discs 148a of both braking devices 146a, 146b at opposite ends of the actuating device 132'. The metallic discs 148, 149 and pads 150 may be pressed together via a common biasing member or spring 152' positioned along axle portion 136'.

Figure 8:
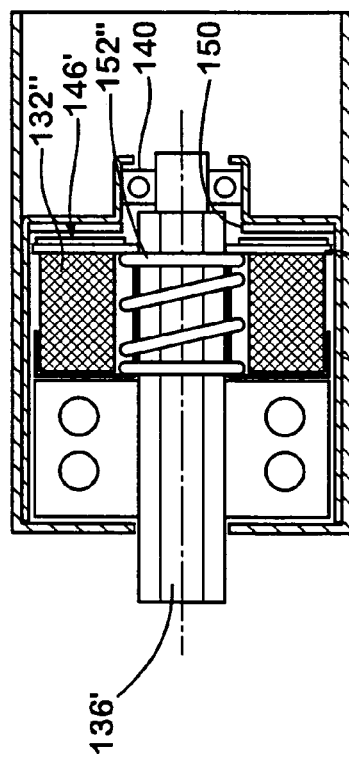
FIG. 8 is a sectional view of another roller and brake cartridge in accordance with the present invention.

As shown in FIG. 8, braking device 146' may include a single metallic plate or disc 148 slidably and non-rotatably positioned along axle portion 136' and a single brake pad 150 positioned at a wall or end portion of housing 138'. Actuating device or electro-magnet or solenoid 132" may be operable to separate disc 148 from pad 150 when activated, while biasing member or spring 152" may function to engage disc 148 with pad 150 when electro-magnet is deactivated, in order to restrict rotation of housing 138' relative to axle portion 136'. Likewise, actuating device or electro-magnet or solenoid 132''' (FIG. 9) may separate metallic disc 148 from pad 150 when electro-magnet 132''' is activated, while a biasing member or spring 152''' may urge disc 148 into engagement with pad 150 when electro-magnet 132''' is deactivated.

Figure 13:
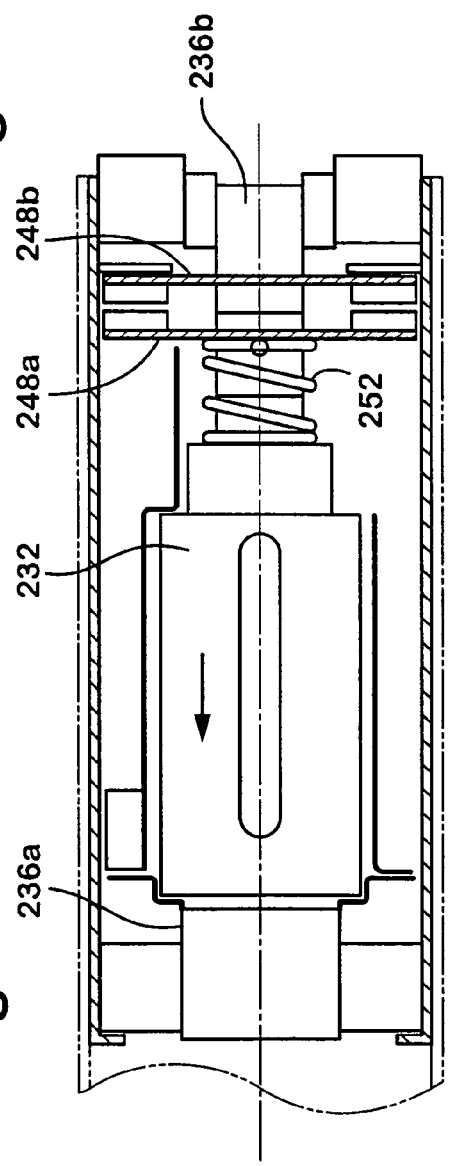
FIG. 13 is a sectional view of another roller and brake cartridge in accordance with the present invention.
Figure 10:
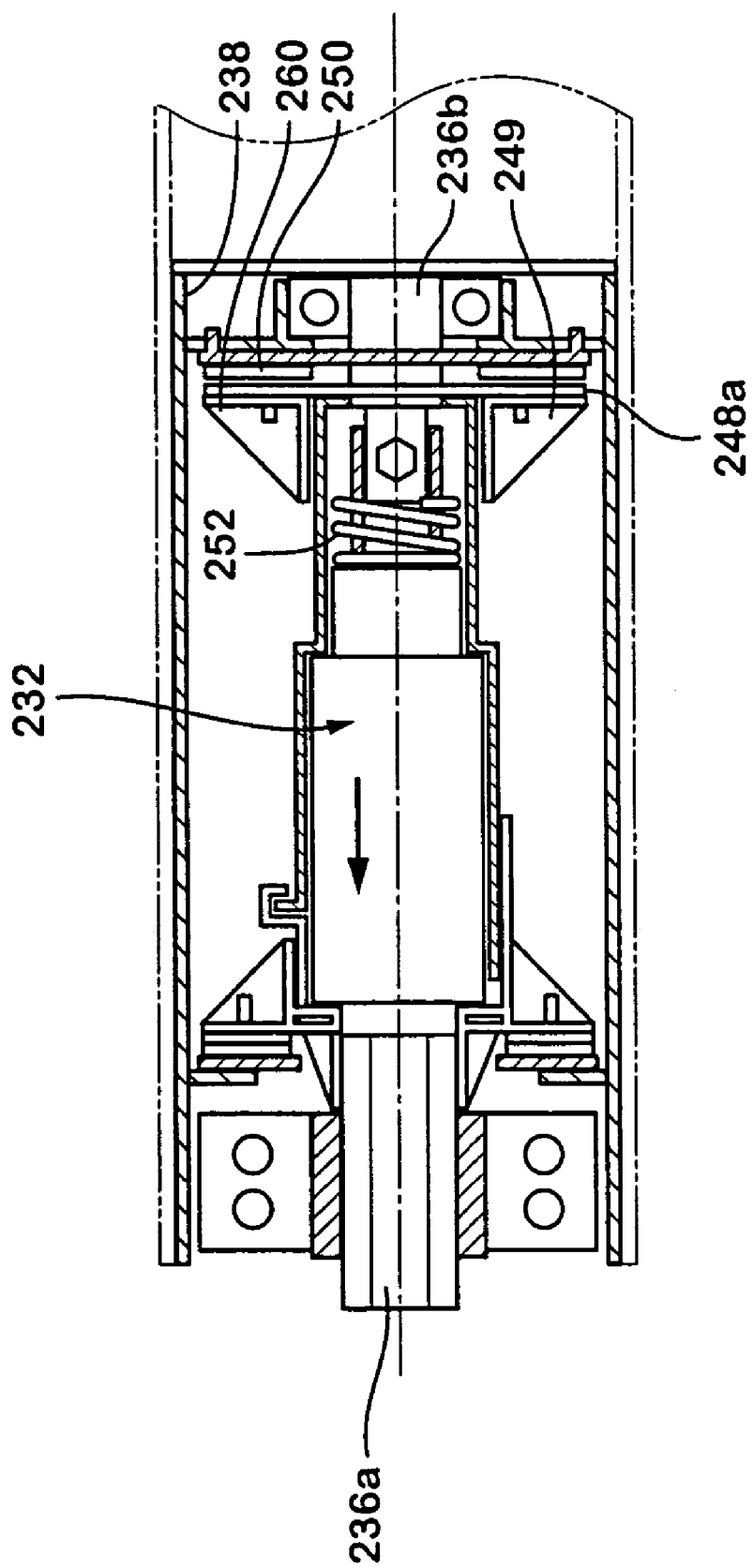
FIG. 10 is a sectional view of another roller and brake cartridge in accordance with the present invention.

Referring now to FIGS. 10–16, several axle cartridges are shown that have the actuating device or electromagnet or solenoid 232 movably positioned between and connected to axle portions 236a, 236b. As described above, actuation of actuating device 232 causes separation of at least one of the metallic discs 248a (which may be mounted to a plastic hub or bracket 260 that is movable with discs 248 and attached to solenoid 232) from the brake pads 250 and other steel discs or plates 248b to allow substantially unrestricted rotation of cartridge housing 238 about axle portions 236a, 236b. When solenoid 232 is deactivated, a spring or biasing member 252 functions to push against at least one of the metallic discs 248 to press the discs 248 against the brake pads 250 (and optionally against or between other outer discs 249) to restrict rotation of the housing 238 about the axle portions 236a, 236b. As shown in FIG. 13, actuating device 232 may function to separate one disc 248a from another disc 248b, without the friction material or pads.

Figures 14, 15, 16:
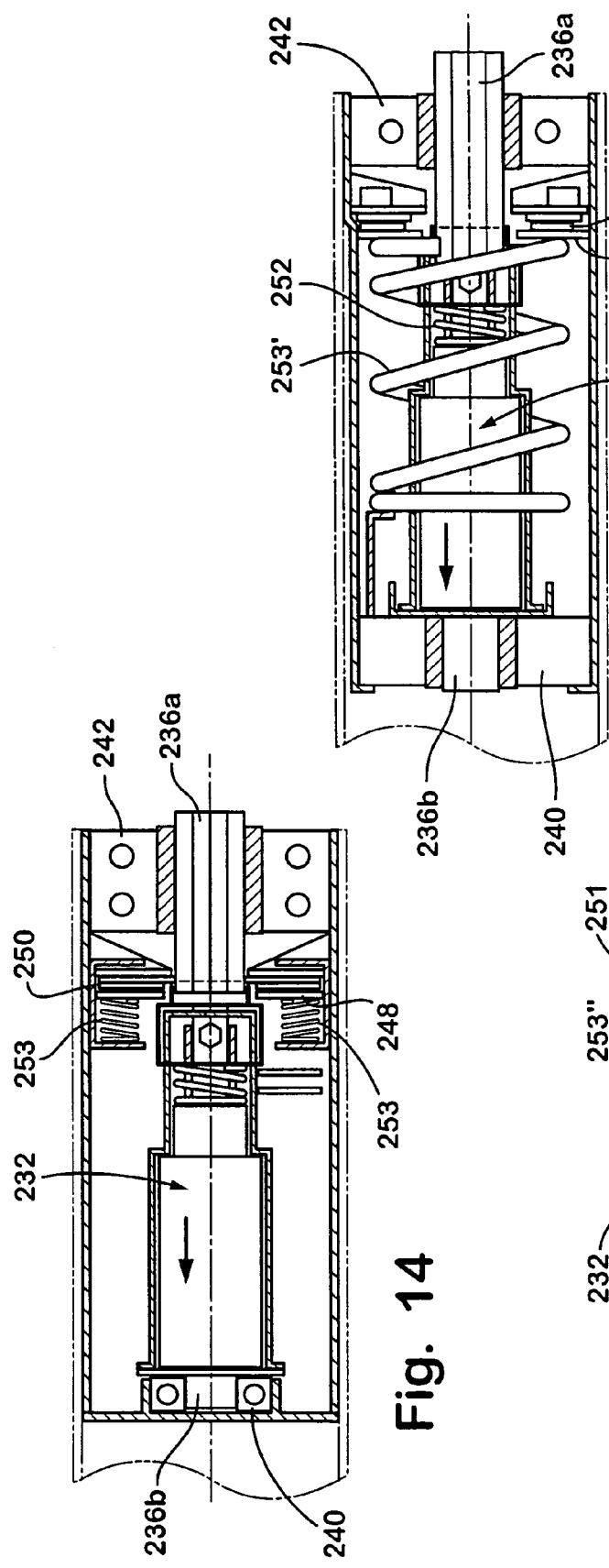
FIG. 14 is a sectional view of another roller and brake cartridge in accordance with the present invention.
FIG. 15 is a sectional view of another roller and brake cartridge in accordance with the present invention.
FIG. 16 is a sectional view of another roller and brake cartridge in accordance with the present invention.
Figure 21:
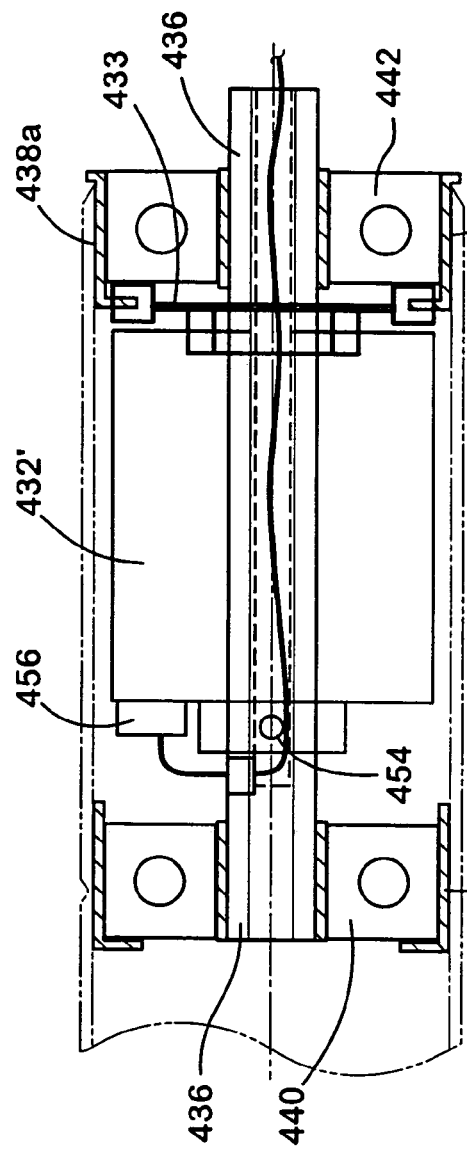
FIG. 21 is a sectional view of another roller and brake cartridge in accordance with the present invention.
Figure 22:
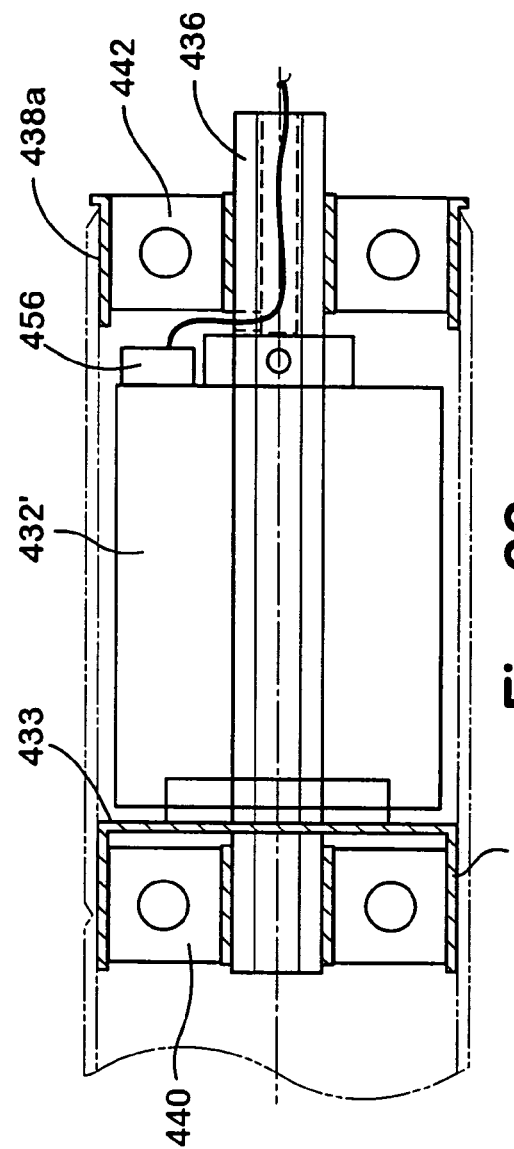
FIG. 22 is a sectional view of another roller and brake cartridge in accordance with the present invention.

With reference to FIG. 14, one or more outer springs or biasing members 253 may be positioned around the actuating device 232 and may function to press the plates or discs 248 and pads 250 together when actuating device 232 is deactivated and, thus, not separating the discs 248 from the pads 250. As shown in FIG. 15, one larger diameter spring 253' may be implemented to press the discs 248 and pads 250 together when actuating device 232 is deactivated. As shown in FIG. 16, an additional spring 253" may press a brake pad 251 radially outwardly to engage the inner surface of housing 238 of the brake cartridge.

Referring now to FIGS. 17 and 18, two embodiments are shown where the activating device or solenoid 332 is operable to move an engaging member 360 between an engaged or braking position when actuating device 332 is deactivated (where the engaging member 360 is moved to the braking position via a biasing member or spring 352) and a disengaged or releasing position when actuating device 332 is activated. In the disengaged position (as shown in FIGS. 17B and 18), engaging member 360 is separated from a stopping plate 362. Stopping plate 362 is generally fixedly mounted to or positioned relative to housing 338 of brake cartridge 324, while actuating device 332 and engaging member 360 are attached to axle portion 336. The inner end of the actuating device may be supported by the inner bearing assembly 340, which may engage an inner surface of housing 338 or an outer adapter at the inner surface of the housing to rotatably support the inner end of the actuating device relative to the housing of the brake cartridge.

As can be seen in FIG. 17A, engaging member 360 comprises a non-circular shape and an opening 362a in stopping plate 362 is correspondingly formed, such that engaging member 360 may be inserted into opening 362a in stopping plate 362 to limit or substantially preclude or restrict relative rotation between engaging member 360 and stopping plate 362. In the illustrated embodiment, engaging member 360 and opening 362a are generally star-shaped with six points, but other shapes may be implemented without affecting the scope of the present invention. Engaging member 360 may have a tapered end 360a to ease insertion of engaging member into opening 362a of stopping plate 362.

During operation of axle cartridge 324, actuating device 332 may be activated to pull or move engaging member 360 away from stopping plate 362, such that stopping plate 362 and housing 338 may rotate relative to actuating device 332 and axle portion 336. When actuating device 332 is deactivated, spring 352 urges engaging member 360 toward and into the correspondingly formed opening 362a in stopping plate 362. As engaging member 360 enters opening 362a, the points or edges of engaging member 360 engage the corresponding walls or points of opening 362a to stop or restrict relative rotation between engaging member 360 and stopping plate 362, thereby stopping relative rotation between housing 338 and axle portion 336. In the embodiments of FIGS. 17A, 17B and 18, the stopping plate 362 may be generally fixedly secured relative to housing 338. Optionally, the stopping plate may be frictionally retained at the inner surface of the housing, such as via brake pads and springs similar to brake pad 251 and spring 253" of FIG. 16, without affecting the scope of the present invention. The brake pad may allow the stopping plate to slide relative to the housing at the onset of braking to provide smoother braking by the brake cartridge.

Referring now to FIGS. 19–24, several embodiments are shown that incorporate an actuating and braking device 432 that includes the actuating device or electro-magnet or solenoid and the braking discs or plates and pads (or other braking mechanisms) within a contained unit, such as a commercially available unit, such as are commercially available from various sources. As shown in FIGS. 19B and 20, actuating and braking device 432 may be secured to an outer axle portion 436a at one end, such that a body portion 432a of actuating and braking device 432 is generally fixedly secured relative to outer axle portion 436a. Body portion 432a may be secured relative to outer axle portion 436a via a bracket 433 or the like that is secured at an inner end of outer axle portion 436a, such as via a pin 433a inserted through bracket 433 and outer axle portion 436a (as can be seen in FIGS. 19A and 19B).

Actuating and braking device 432 may include a shaft portion 432b that extends from body portion 432a and that may be substantially freely rotatable when actuating and braking device 432 is deactivated. Shaft portion 432b may extend through an inner axle portion 436b at inner bearing 440, and may non-rotatably engage an inner housing portion 438a of housing 438 of axle cartridge 424. As shown in FIG. 19C, shaft portion 432b may be generally non-circular shaped and may engage a correspondingly formed opening or passageway in inner housing portion 438a of housing 438. Thus, while shaft portion 432b is freely rotatable relative to body portion 432a, housing 438 will rotate with shaft portion 432b.

As shown in FIG. 19B, brake cartridge 424 includes a control board 454 at outer axle portion 436a. Control board 454 is connected to an outside or external control or power source via an electrical wire or connection 458a, and is connected to actuating and braking device 432 via a second electrical wire or connection 458b. Optionally, and as shown in FIG. 20, the control board may be incorporated into the actuating and braking device 432 or may be an external control board external to the brake cartridge, such as the control of the conveyor or of a motorized roller of the conveyor or the like. When actuating and braking device 432 is deactivated, shaft portion 432b may be substantially unrestricted and free to rotate relative to body portion 432a, such that housing 438 may rotate relative to axle portions 436a, 436b. When actuating and braking device 432 is activated, rotation of shaft portion 432b relative to body portion 432a is stopped or substantially restricted, such that rotation of housing 438 is stopped or substantially restricted relative to axle portions 436a, 436b.

With reference to FIGS. 21–24, the actuating and braking device 432' may be non-rotatably and generally fixedly secured to an axle portion 436 of the brake cartridge and may be engagable with a stopping mechanism 433 that is connected to or integral with at least a portion of housing 438. In the illustrated embodiments, housing 438 comprises inner and outer housing portions 438b, 438a, with the stopping mechanism 433 connected to or formed with one of the housing portions. The two-piece housing construction may ease assembly of the brake cartridge. When actuating and braking device 432' is deactivated, stopping mechanism 433 is free to rotate relative to actuating and braking device 432', such that housing 438 is free to rotate relative to axle portion 436. When actuating and braking device 432' is activated, actuating and braking device 432' engages and stops or restricts rotation of stopping mechanism 433, such that rotation of housing 438 about axle portion 436 is restricted or stopped.

Referring now to FIGS. 25A and 25B, an axle cartridge 524 includes an actuating device or solenoid 532 that is operable to restrict rotation of housing 538 relative to axle portion 536 via engagement of an engaging portion 532a with one or more coil springs 552a, 552b when actuating device 532 is actuated. When the ends 553a, 553b of the springs are engaged by engaging portion 532a, rotation of housing 538 and a stopping mechanism 533 about axle portion 536 causes tightening of one of the springs to clamp stopping mechanism 533 about an inner shaft portion 536b, thereby stopping or restricting relative rotation between stopping mechanism 533 and shaft portion 536. The springs may be coiled around a stopping mechanism 533 in opposite directions, such that engaging portion 532a may stop or restrict rotation of the roller via engaging one of the springs in one direction and the other spring in the other direction. Deactivation of actuating device 536 causes retraction of engaging portion 532a to allow the springs to move and thus to allow stopping mechanism 533 and housing 538 to rotate about axle portion 536.

Referring now to FIGS. 26A and 26B, a biasing member or flex spring 652 is operable to press a braking device 646 radially outward to engage housing 638 when actuating device 632 is deactivated. Braking device 646 includes an arm member 646a and a braking pad 650 that is engagable with an inner surface of housing 648 to stop or restrict relative movement of housing 638 relative to braking device 646. When actuating device 632 is activated, actuating device causes retraction of arm member 646a and braking pad 650 to allow for substantially unrestricted rotation of housing 638 about axle portion 636.

Therefore, the present invention provides a braking roller that includes a brake cartridge that is operable to selectively restrict rotation of the roller portion relative to the axle portion of the roller. The brake cartridges include an actuating device, such as an electromagnet or a solenoid or the like, that is operable to engage or disengage a braking mechanism, such as in response to an internal control or in response to an external control, such as a control of a motorized roller of the zone or a main control of the roller conveyor.

Figure 27:
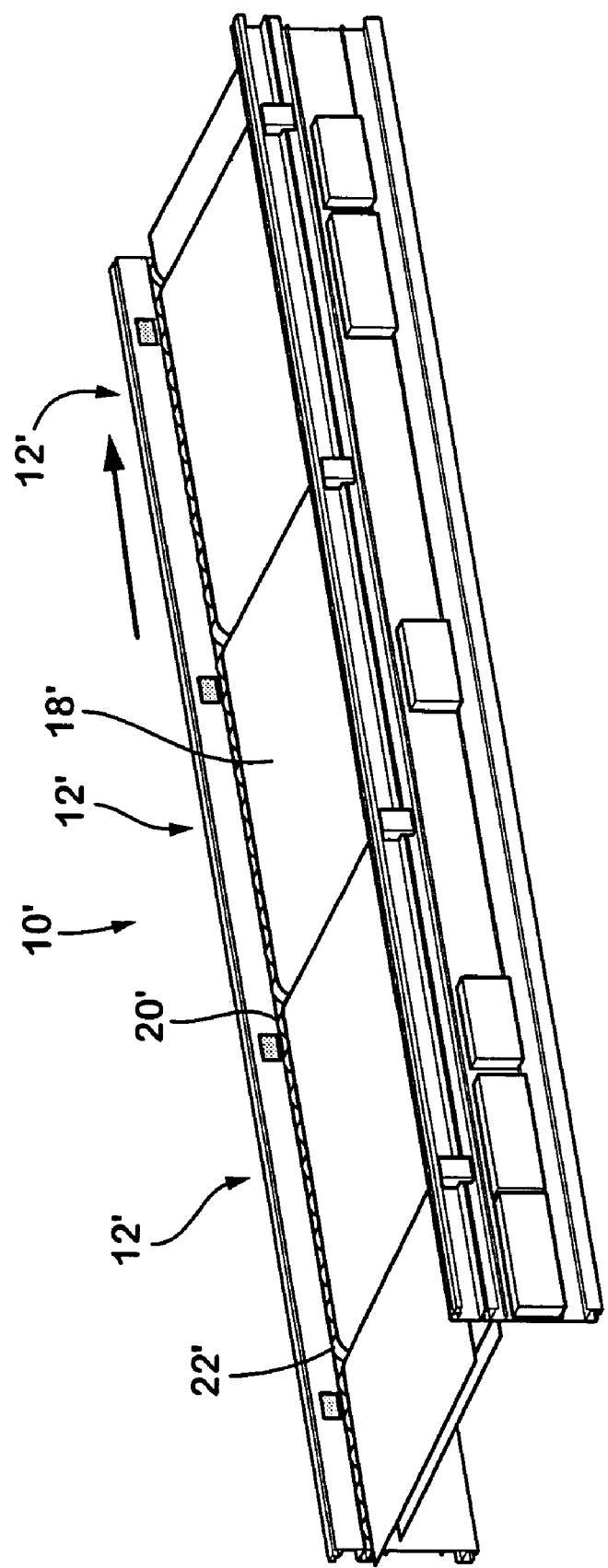
FIG. 27 is a perspective view of a belted conveyor section including at least one roller and brake cartridge in accordance with the present invention.

Although shown and described as being implemented with a roller conveyor 10, it is further envisioned that the brake cartridge of the present invention may be equally suitable for use in rollers or pulleys of a belt conveyor 10' (as shown in FIG. 27). Belt conveyor 10' may comprise multiple belted zones or segments 12' for conveying and accumulating articles along belt conveyor 10' in a similar manner as described above for roller conveyor 10. Each zone or segment or section 12' of belt conveyor 10' may include at least one idler roller or pulley 22' and at least one driven roller 20', such as a motorized roller or pulley as described above, that rotate to move or drive a continuous conveyor belt 18' to convey articles therealong. As shown in FIG. 27, Driven or motorized roller 20' may be the lead roller of the zone or positioned at a downstream end of each segment to pull the belt 18' (and the articles supported thereon) along the respective segment 12'. The belt conveyor 10' may include one or more article sensors 30', such as one sensor at the end of each zone 12', and may be operable to convey and accumulate articles on the zones of the conveyor 10' in response to the article sensors, such as described above with respect to roller conveyor 10. The belt 18' of belt conveyor 10' may comprise a conventional belt or belt material, or may comprise a belt material that has an enhanced stretch characteristic, such as described in U.S. Pat. No. 6,811,018, which is hereby incorporated herein by reference.

The present invention thus provides a brake cartridge that may be inserted into or incorporated into a roller of a roller conveyor or belt conveyor or the like. The brake cartridge may be selectively operable to stop or limit or restrict rotation of the roller portion of the braking roller relative to the axle portion and thus may restrict driving or rolling of the other rollers of the respective zone, in order to stop and accumulate articles on the zone. The brake cartridge may be operable to restrict rotation in response to or in coordination with the deactivation of the driven or motorized roller of the respective zone. The brake cartridge and braking roller of the present invention are particularly suited for applications with an inclined conveyor section, where actuation of the braking mechanism of the brake cartridge may limit or substantially preclude downward movement of articles on the conveyor when the driven roller or pulley of the conveyor is deactivated or stopped.

Changes and modifications in the specifically described embodiments may be carried out without departing from the principles of the present invention, which is intended to be limited only by the scope of the appended claims, as interpreted according to the principles of patent law.

The embodiments of the present invention in which an exclusive property or privilege is claimed are defined as follows:

1. A brake cartridge for a roller of a conveyor, the roller being positionable between opposite sidewalls of the conveyor and having a roller portion that is rotatable to convey articles along the conveyor, said brake cartridge comprising:
   an axle portion mountable to one of the sidewalls of the conveyor;
   a housing rotatably mounted to said axle portion, said housing being insertable at least partially into an end of the roller portion of the roller; and
   a braking device that is selectively operable to restrict rotation of said housing relative to said axle portion to restrict rotation of the roller portion of the roller when said brake cartridge is inserted at least partially into the end of the roller portion, wherein said braking device comprises a first plate non-rotatably positioned relative to said housing and a second plate non-rotatably positioned relative to said axle portion, said braking device being selectively operable to engage said first and second plates to restrict rotation of said housing relative to said axle portion.

2. The brake cartridge of claim 1, wherein said braking device includes an actuating device and a biasing member, said actuating device being selectively activatable to disengage said first and second plates, said biasing member being configured to engage said first and second plates when said actuating device is deactivated.

3. The brake cartridge of claim 2, wherein said braking device includes two first plates, said second plate being positioned between said two first plates.

4. The brake cartridge of claim 2, wherein said braking device includes two second plates, said first plate being positioned between said two second plates.

5. The brake cartridge or claim 2, wherein said actuating device comprises one of an electro-magnet and a solenoid.

6. The brake cartridge of claim 2, wherein one of said first and second plates comprises a metallic plate and the other of said first and second plates comprises a brake pad.

7. The brake cartridge of claim 6, wherein said actuating device comprises an electro-magnet that is selectively operable to move said metallic plate relative to said brake pad.

8. The brake cartridge of claim 2, wherein one of said first and second plates comprises a non-circular opening at least partially therethrough and the other of said first and second plates comprises a non-circular protrusion, said non-circular protrusion being insertable at least partially into said non-circular opening when said first and second plates arc engaged.

9. The brake cartridge of claim 2, wherein said actuating device is deactivated when a driven roller of the conveyor is deactivated.

10. A brake cartridge for a roller of a conveyor, the roller being positionable between opposite sidewalls of the conveyor and having a roller portion that is rotatable to convey articles along the conveyor, said brake cartridge comprising:
    an axle portion mountable to one of the sidewalls of the conveyor;
    a housing rotatably mounted to said axle portion, said housing being insertable at least partially into an end of the roller portion of the roller; and
    a braking device that is selectively operable to restrict rotation of said housing relative to said axle portion to restrict rotation of the roller portion of the roller when said brake cartridge is inserted at least partially into the end of the roller portion, wherein said braking device comprises a body portion and a shaft portion, one of said body and shaft portions being attached to said axle portion and the other of said body and shaft portions being attached to said housing, said braking device being selectively operable to restrict rotation of said shaft portion relative to said body portion to restrict rotation of said housing relative to said axle portion.

11. The brake cartridge of claim 10 including at least one bearing assembly positioned between said housing and said axle portion to rotatably mount said housing to said axle portion.

12. The brake cartridge of claim 10 wherein said braking device includes an actuating device and a biasing member, said actuating device being selectively activatable to allow substantially unrestricted rotation of said housing about said axle portion, said biasing member being biased to restrict rotation of said housing relative to said axle portion when said actuating device is deactivated.

13. The brake cartridge of claim 12, wherein said actuating device is deactivated when a driven roller of the conveyor is deactivated.

14. A conveyor for conveying articles along a conveying surface, said conveyor comprising:
    a plurality of rollers mounted between opposite sidewalls of said conveyor, wherein one of said rollers comprises a braking roller, said braking roller comprising:
      a roller portion;
      a brake cartridge inserted at least partially within one cod of said roller portion, said brake cartridge comprising a housing, an axle portion and a braking device, said braking device being selectively operable to restrict rotation of said housing relative to said axle portion, said housing engaging an inner surface of said roller portion, said axle portion being mounted to one of said sidewalls; and
      a second cartridge inserted at least partially within the other end of said roller, portion, said second cartridge comprising a second axle portion and a second housing rotatable about said second axle portion and engaging said inner surface of said roller portion, said second axle portion being mounted to the other of said sidewalls, said second cartridge comprising one of a motor cartridge, an idler cartridge and a second brake cartridge; and
    at least one drive member reeved around at least some of said rollers.

15. The conveyor of claim 14, wherein said second cartridge comprises said idler cartridge.

16. The conveyor of claim 14, wherein another of said rollers comprises a motorized roller having a motor cartridge inserted at least partially within a roller portion of said motorized roller, said motor cartridge of said motorized roller having an internal motor, said internal motor being activatable to rotatably drive said roller portion of said motorized roller relative to an axle portion of said motor cartridge and deactivatable to stop said driving.

17. The conveyor of claim 16, wherein said braking device is operable to restrict rotation of said housing and said roller portion of said braking roller relative to said axle portion of said brake cartridge when said internal motor of said motor cartridge of said motorized roller is deactivated.

18. The conveyor of claim 14, wherein said second cartridge comprises a motor cartridge.

19. The conveyor or claim 17, wherein said braking device includes an actuating device and a biasing member, said actuating device being selectively activatable to allow substantially unrestricted rotation of said housing relative to said axle portion, said biasing member being configured to restrict rotation of said housing relative to said axle portion when said actuating device is deactivated.

20. The conveyor of claim 19 including a control, said control being operable to activate and deactivate said internal motor and said actuating device together.

21. The conveyor of claim 19, wherein said braking device includes a first plate non-rotatably positioned relative to said housing and a second plate non-rotatably positioned relative to said axle portion, said actuating device being selectively activatable to disengage said first and second plates, said biasing member being configured to engage said first and second plates when said actuating device is deactivated.

22. The conveyor of claim 21, wherein said actuating device comprises one of an electro-magnet and a solenoid.

23. The conveyor of claim 17, wherein said motor cartridge comprises an internal motor, said internal motor being activatable to rotatably drive said roller portion relative to an axle portion of said motor cartridge and deactivatable to stop said driving.

24. The conveyor or claim 23, wherein said braking device is operable to restrict rotation of said housing and said roller portion relative to said axle portion of said brake cartridge when said internal motor of said motor cartridge is deactivated.

25. The conveyor of claim 23, wherein said braking device includes an actuating device and a biasing member, said actuating device being selectively activatable to allow substantially unrestricted rotation of said housing relative to said axle portion of said brake cartridge, said biasing member being configured to restrict rotation of said housing relative to said axle portion of said brake cartridge when said actuating device is deactivated.

26. The conveyor of claim 25 including a control, said control being operable to activate and deactivate said internal motor and said actuating device together.

27. A conveyor for conveying articles along a conveying surface, said conveyor comprising:
at least one idler roller mounted between said opposite sidewalls;
a driven roller mounted between opposite sidewalls of said conveyor, each of said driven roller and said at least one idler roller having a roller portion that is rotatable relative to an axle portion, said axle portions being mounted to said opposite sidewalls, said driven roller being actuatable to rotatable drive said roller portion relative to said axle portion of said driven roller;
at least one drive member reeved around said driven roller and said at least one idler roller, said driven roller being operable to drive said at least one drive member to rotatably drive said roller portion of said at least one idler roller to move articles along said conveyor, said driven roller being deactivatable to stop conveying the articles along said conveyor; and
a braking device, at least one of said rollers comprising a braking roller and having said braking device positioned at least partially within said portion of said braking roller, said braking device being selectively operable to restrict rotation of said roller portion of said braking roller relative to said axle portion or said braking roller, said braking device being operable to restrict rotation of said roller portion when said driven roller is deactivated, said braking device including an actuating device and a braking mechanism, said actuating device being selectively operable to engage and disengage said braking mechanism to restrict and unrestrict rotation of said roller portion about said axle portion, wherein said braking mechanism comprises a first plate non-rotatably positioned relative to said housing and a second plate non-rotatably positioned relative to said axle portion, said actuating device being selectively operable to engage and disengage said first and second plates to restrict and unrestrict rotation of said roller portion about said axle portion.

28. The conveyor of claim 27, wherein said conveyor comprises a roller conveyor, said at least one idler roller comprises a plurality of idler rollers, said rollers defining said conveying surface of said roller conveyor.

29. The conveyor of claim 27, wherein said conveyor comprises a belt conveyor, said at least one drive member comprising a continuous conveying belt reeved around said motorized roller and said at least one idler roller and defining said conveying surface of said belt conveyor.

30. The conveyor of claim 27, wherein said driven roller comprises a motorized roller having an internal motor that is operable to rotate said roller portion relative to said axle portion of said motorized roller.

31. The conveyor of claim 30, wherein said braking device is activated to allow substantially unrestricted rotation of said roller portion relative to said axle portion when said internal motor is activated.

32. The conveyor of claim 31, wherein said braking device is biased to restrict rotation of said roller portion relative to said axle portion when said braking device is deactivated, said braking device being deactivated when said internal molar is deactivated.

33. The conveyor of claim 27, wherein said braking roller includes a brake cartridge that includes an axle portion and a housing that is at least partially received within said roller portion of said braking roller, said braking device being positioned at least partially within said housing.

34. The conveyor of claim 27, wherein said braking device includes a biasing member, said biasing member being configured to engage said braking mechanism to restrict rotation of said roller portion when said actuating device is deactivated.

35. The conveyor of claim 27, wherein said actuating device comprises one of an electro-magnet, and a solenoid.

36. The conveyor of claim 27, wherein said actuating device comprises an electro-magnet, one of said first and second plates comprising a metallic plate and the other of said first and second plates comprising a brake pad, said electro-magnet being selectively operable to move said metallic plate relative to said brake pad.

* * * * *

UNITED STATES PATENT AND TRADEMARK OFFICE
CERTIFICATE OF CORRECTION

PATENT NO. : 7,021,456 B2
APPLICATION NO. : 10/993301
DATED : April 4, 2006
INVENTOR(S) : Haan et al.

It is certified that error appears in the above-identified patent and that said Letters Patent is hereby corrected as shown below:

Column 9
Line 14, "or" should be --of--

Column 15
Claim 5, Line 45, "or" should be --of--
Claim 8, Line 58, "arc" should be --are--

Column 16
Claim 14, line 39, "cod" should be --end--

Column 17
Claim 19, Line 8, "or" should be --of--
Claim 23, Line 28, "claim 17" should be --claim 18--
Claim 24, Line 33, "or" should be --of--
Claim 27, Line 58, "rotatable" should be --rotatably--

Column 18
Claim 27, Line 5, insert --roller-- before "portion"
Claim 27, Line 8, "or" should be --of--
Claim 32, Line 44, "molar" should be --motor--

Signed and Sealed this

Twenty-seventh Day of May, 2008

JON W. DUDAS
*Director of the United States Patent and Trademark Office*